United States Patent [19]
Boston

[11] 3,789,734
[45] Feb. 5, 1974

[54] ADJUSTABLE SCARFING TOOL

[75] Inventor: Denis R. Boston, Livingston, Ill.

[73] Assignee: Olin Corporation, New Haven, Conn.

[22] Filed: Apr. 21, 1972

[21] Appl. No.: 246,307

[52] U.S. Cl. .............................. 90/24 B, 29/33 D
[51] Int. Cl. ............................................ B23d 1/24
[58] Field of Search .......... 90/24 B, 24 R; 29/33 D; 219/59

[56] References Cited
UNITED STATES PATENTS

| | | | |
|---|---|---|---|
| 3,349,212 | 10/1967 | Morris et al. | 219/59 |
| 3,177,776 | 4/1965 | Marhanka | 90/24 B |
| 1,912,419 | 6/1933 | Whitman | 90/24 B |
| 1,954,511 | 4/1934 | Adams, Jr. | 90/24 B |
| 3,165,028 | 1/1965 | Keska | 90/24 B |

FOREIGN PATENTS OR APPLICATIONS

| | | | |
|---|---|---|---|
| 1,326,161 | 3/1963 | France | 90/24 B |

Primary Examiner—Andrew R. Juhasz
Assistant Examiner—Z. R. Bilinsky
Attorney, Agent, or Firm—Robert H. Bachman

[57] ABSTRACT

An adjustable scarfing apparatus comprising an elongated body member supporting a cutting tool within a welded tube. In accordance with one embodiment, a plurality of slides are dispersed radially about the body and at least one of the slides is made continuously adjustable inwardly or outwardly from the body. In accordance with another embodiment, a cutting tool having a circular cutting edge which may be indexed is employed with the plane of the cutting edge. The plane of the cutting edge is inclined at an angle of from about 30° to about 60° to the longitudinal axis of the tube. Alternatively, the apparatus may include both of these embodiments.

7 Claims, 9 Drawing Figures

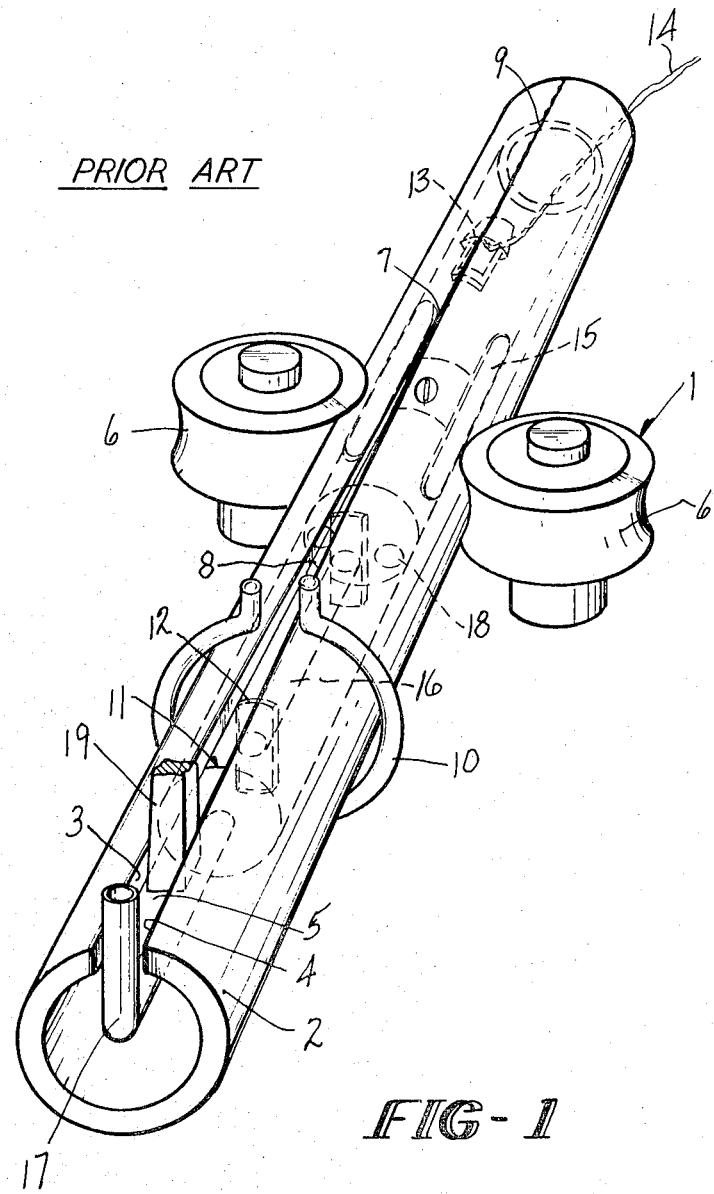

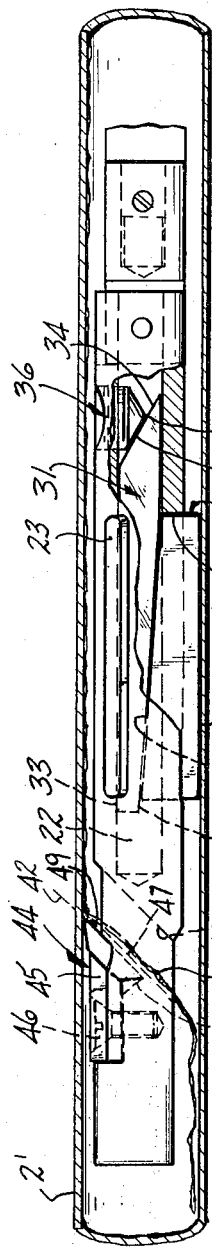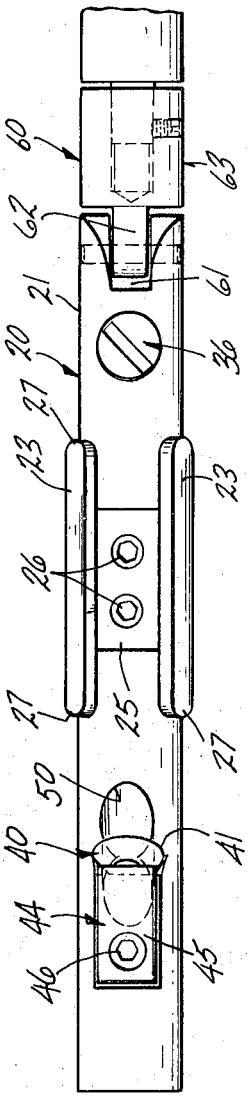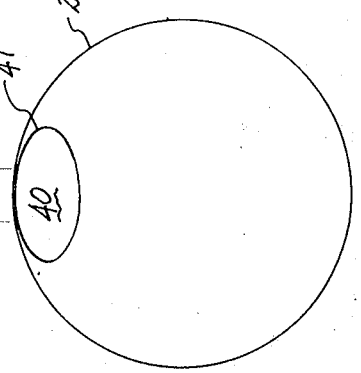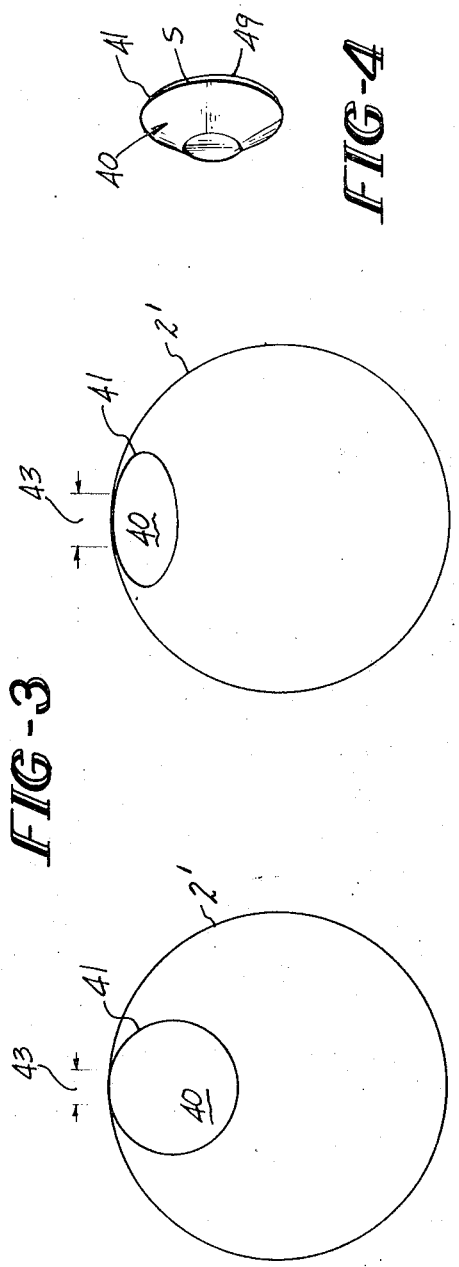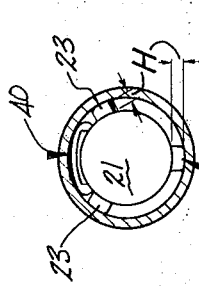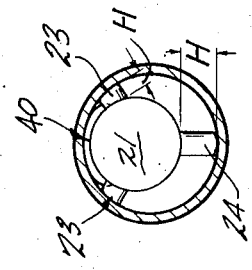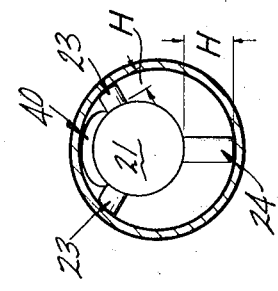

ADJUSTABLE SCARFING TOOL

BACKGROUND OF THE INVENTION

This invention deals with an improved scarfing apparatus and a welding apparatus employing same, for welding metal strip into tube. This invention is particularly directed to an improved scarfing apparatus for use in a process of high frequency forge welding. Typical examples of prior art high frequency forge welding apparatuses and processes are set forth in U.S. Pat. Nos. 3,037,105, granted May 29, 1962; 2,794,108, granted May 28, 1957; and 2,818,488, granted Dec. 31, 1957.

After the strip has been formed into a tubular shape the strip edges are heated to the welding temperature and then passed to a welding station wherein the edges are pressed against each other with sufficient force to forge weld them together thereby providing a fluid and pressure tight tube. The welded tube contains a longitudinally extending weld seams and a weld bead on its inside and outside surface at the weld seam. This invention is concerned with the removal of the weld bead from the inside surface of the tube.

Apparatuses are known in the art for removal of the weld bead on the inside surface of the tube. One specific example is set forth in U.S. Pat. No. 3,349,212, granted Oct. 24, 1967. This patent discloses a scarfing apparatus for removing the weld bead which comprises a mandrel supporting a scarfing tool which may be indexed and an impeder. The mandrel has secured radially on its outer surface a plurality of slides or wear strips for supporting and aligning the mandrel and scarfing tool relative to the tube and weld bead.

These radially disposed slides contribute a pressure reaction to the cutting tool and maintain it in cutting position within a few thousandths of an inch for a uniform and controlled depth of cut. The scarfing apparatus of the patent can be used in tubes of various sizes by utilizing slides of appropriate heights in accordance with the tube diameter or by adjusting the extent to which the slides are seated in their respective recesses.

This latter adjustment is usually performed by inserting or removing shims from behind the slides and is required to compensate for differences in tube wall thicknesses for given outside diameters. It has been found that the use of shims to provide this essential adjustment involves a trial and error process which by its nature is extremely time consuming.

SUMMARY OF THE INVENTION

In accordance with this invention an improved scarfing apparatus has been developed in that provision has been made in the apparatus for providing continuous adjustment of the height of at least one of the radially disposed slides for compensating for differences in tube wall thickness. This adjustment may be provided by means of a screw which acts upon a cam which in turn acts upon the adjustable radial slide or slides to provide inward and outward movement of the slide or slides with respect to the body of the scarfing apparatus.

In accordance with another embodiment of this invention, the scarfing apparatus may contain a cutting tool having a circular cutting edge which may be indexed. The plane of the cutting edge is inclined toward the longitudinal axis of the tube at an angle of 30° to 60° and preferably at an angle of 45°.

This incline of the cutting tool provides an excellent path for the I.D. scarf or weld bead which is being removed to travel through the body of the scarfing apparatus to the bottom of the tube to be carried along with the tube. This incline of the cutting edge of the tool also provides through a geometric advantage an effective increase in the width of the cutting surface for a given diameter cutting tool over a range of tube diameters.

By providing a cutting tool in accordance with this invention inclined about 45° to the longitudinal axis of the tube, it is possible to scarf tubing of varying diameters within a given range while leaving a residual flash of less than 0.002. Preferably, the apparatus in accordance with this invention contains both an inclined cutting tool and at least one adjustable slide as aforenoted.

It is accordingly an object of this invention to provide an adjustable scarfing apparatus for removing the weld bead on the inside surface of a welded tube.

It is a further object of this invention to provide an apparatus as above with a plurality of slides radially dispersed about the periphery of the apparatus wherein at least one of the radial slides is continuously adjustable inwardly and outwardly with respect to the body of the apparatus.

It is a further object of this invention to provide an apparatus as above wherein the scarfing apparatus includes a cutting tool having a circular cutting edge with the plane of the cutting edge inclined at an angle of about 30° to 60° to the longitudinal axis of the tube.

It is a further object of this invention to provide an apparatus as above having at least one adjustable radial slide and a cutting tool with a circular cutting edge inclined as above.

It is a further object of this invention to provide a welding apparatus for high frequency welding metal strip into tubing employing the scarfing apparatus as above.

Other objects and advantages will become apparent to those skilled in the art as a detailed description of the preferred embodiments proceeds with reference to the drawings.

BRIEF DESCRIPTION OF THE DRAWINGS

FIG. 1 shows a perspective view of a typical high frequency welding apparatus.

FIG. 2 shows a partial cross sectional view of the adjustable scarfing apparatus of this invention in its operable position within the as-welded tube.

FIG. 3 shows a top view of the scarfing apparatus of this invention.

FIG. 4 shows a perspective view of the cutting tool which may be used in the scarfing apparatus of this invention.

FIGS. 5A and 5B illustrate the effective increase in cutting surface obtained with the scarfing apparatus of the instant invention by inclining the cutting tool with respect to the longitudinal axis of the tube.

FIGS. 6A–6C show a plurality of views of as-welded tubes with the scarfing apparatus in place, wherein the as-welded tubes vary substantially in diameter.

DETAILED DESCRIPTION OF THE PREFERRED EMBODIMENTS

Referring now to the drawings and especially to FIG. 1, there is illustrated a typical welding apparatus 1 for welding metal strip in the form of a preformed open tube 2 into tubing. The apparatus is adapted to weld together the opposed edges 3 and 4 which form the longitudinal gap 5 in the open metal tubing 2.

The open tube 2 is formed in a forming mill (not shown) situated in line immediately preceding the apparatus 1. The forming mill is of conventional well known design. The forming mill may contain a plurality of roll stands or dies which form metal strip into the open tube 2. It is to be understood that other roll stands may be situated in line immediately following the apparatus 1 to further shape or size the tubing such as, for example, to correct out of roundness. The roll stands are generally power driven and, therefore, provide means for rapidly and longitudinally advancing the tubing. Alternatively, this means may be power driven weld rolls 6 as shown.

The weld rolls 6 comprise a pair of pressure rollers of known form which engage opposite sides of the tube 2 and cause the longitudinally extending gap 5 therein to become closed substantially at a weld point 7 forming a V shaped gap 8. As the open tubing 2 advances to the weld point 7, the edges 3 and 4 at the gap 8 become welded together along the weld seam 9.

The edges 3 and 4 and the V shaped gap 8 are heated by means of an induction coil 10 or contacts. The induction coil 10 shown is a single turn coil; however, a multiturn coil or other appropriate device could be substituted for the single turn coil.

The coil 10 is formed of wrought metal tubing. The coil is electrically connected to a source of high frequency current, not shown. The high frequency current is normally at least 100 kilocycles per second and, preferably, at least 400 kilocycles per second or higher. The coil is also connected to a source of cooling medium (not shown) which flows through the tubing to keep it from overheating.

The apparatus 1 also includes the following elements as shown schematically in FIG. 1. A scarfing apparatus 11 comprises a man-drel 12 which supports a cutting tool 13 for removing the weld bead 14 on the inside surface of the tube 2'. A plurality of slides 15 are provided about the periphery of the mandrel 12 for supporting and aligning it and the cutting tool 13 relative to the tube 2' and weld bead 14.

The mandrel 12 may be of any known construction and the shape shown in FIG. 1 is merely schematic. A typical example of a prior art mandrel 12 is shown in U.S. Pat. No. 3,349,212. The mandrel 12 may also support an impeder 16 for improving the efficiency of the induction coil 10 by increasing the impedance of the high frequency current paths around the back of the open tube 2.

This reduces the flow of current around the back of the tube 2 and increases the flow of current along the tube edges 3 and 4 running from a point on the tube edge 3 adjacent the coil 10 to the weld point 7 and back the opposing edge 4 to a point adjacent the coil 10. This results in more efficient heating of the edges 3 and 4 of the open tube 2, the edges being heated up to the welding temperature upon reaching the weld point 7. The impeder may be of any suitable known construction as, for example, that set forth in U.S. Pat. No. 3,349,212.

A source of cooling medium (not shown) such as water is connected to a hollow supporting arm 17 for flowing water about a core of magnetic material which comprises the impeder 16. The core of magnetic material should be of an insulating nature to provide a core substantially free of eddy current losses. The core is preferably a sintered magnetic oxide insulating material, preferably of types now well known which have a low loss factor and high volume resistivity. A suitable material is marketed under the name "Ferramic" by General Ceramic and Steatite Corporation, the permeability thereof being substantially greater than unity.

The cooling medium passes through the hollow supporting arm 17 and flows about the impeder 16 and is then discharged within the welded tube 2' through holes 18.

Further, since the angle of the V shaped gap 8 is important, a seam guide means 19 is generally included at a point in advance of the induction coil 10 to accurately space apart the edges of the tube 2 and, thereby, obtain the desired angle. The seam guide means may be formed of a suitable insulating material protruding down into the gap so that the roll stand preceding that position (not shown) will cause the tube gap edges 3 and 4 to be pressed against the opposite sides of the seam guide 19 whereby the edges are maintained with a uniform separation.

The welding apparatus just described is but one type of apparatus useful with the instant invention and numerous other high frequency welding apparatus are known which could be employed in place thereof.

The combination of an impeder-scarfing apparatus may comprise a single body or mandrel incorporating both a scarfing tool and an impeder as in FIG. 1 or connected bodies one of which contains the scarfing tool and the other the impeder. This latter approach is particularly useful when employing impeders having a design analogous to that shown in U.S. Pat. No. 3,054,883, granted Sept. 18, 1962. However, this invention is equally applicable to both types of apparatuses and is also applicable to welding apparatuses employing a scarfing apparatus without an impeder.

This invention is directed to the slides which are supported about the periphery of the scarfing apparatus and to the orientation of the plane of the cutting edge of the cutting tool.

Referring to FIGS. 2 and 3 in accordance with one embodiment of the invention the scarfing apparatus 20 comprises a body 21 which consists of an elongated member. The body 21 has a bore 22 or hole extending substantially centrally and longitudinally within it. The cross sectional shape of the bore 22 may be chosen as desired. A cylindrical bore 22 is shown. The scarfing apparatus 20 of FIGS. 2 and 3 contains three radial slides 23 and 24; however, any desired number could be employed and it is noted, for example, that in U.S. Pat. No. 3,349,212, four slides are employed.

Two of the slides 23 are clamped by a plate 25 which fits in a recess of the body 21 such that the outside contour of the plate substantially corresponds to the outside contour of the body. The plate 25 and therefore, the slides 23 are mounted to the body 21 by means of screws 26.

The slides 23 and 24 as shown comprise elongated members having curved end portions 27. They may be formed of any desired material depending on the surface quality required in the finished product. Various high wear resistant nylons are particularly adapted to be used as slides and if surface quality tolerances are liberal metal slides formed of materials such as leaded brass could be employed. The particular material employed for the slides are well known in the art and are not considered to be a part of the instant invention.

In accordance with this invention, at least one of the slides 24 as shown in FIG. 2 is moveable inwardly or outwardly with respect to the body 21 of the scarfing apparatus 20. The moveable slide 24 as shown in FIG. 2 moves within a hole 28 in the body 21 which conforms in cross section as close as possible to the shape of the outside periphery of the slide. The hole 28 in the body communicates with the bore 22.

The outside face 29 of the slide 24 engages the welded tube 2'. The opposing face 30 of the slide 24 is inclined with respect to the face 29 and the longitudinal axis of the tube 2' a desired amount to provide an inclined plane. The degree of incline may be set as desired depending on the size of the scarfing apparatus 20 particularly the diameter of the body 21. For a ⅝ inch body diameter, it has been found preferably to employ an incline on the inside face 30 of the slide 24 of from about 3° to about 8° with respect to the longitudinal axis of the tube 2'.

A cam 31 is provided within the bore 22 of the body 21 having one operable face 32 adapted to contact the inclined face 30 of the adjustable slide 24 and, therefore, having an angle of inclination with respect to the longitudinal axis of the tube 2' substantially the same as the inclined face 30 of the slide 24. The cam 31 comprises an elongated member adapted to move within the bore 21 of the body. The face 33 of the cam 31 opposing the face 32 which contacts the adjustable slide 24 contacts the inside surface of the bore 21 and preferably conforms to the cross sectional shape of the inside surface of the bore.

One of the end faces 34 of the cam 31 which lies intermediate the cam face 33 which contacts the surface of the bore 21 and the cam face 32 which contacts the inclined face 30 of the slide 24 is inclined with respect to the longitudinal axis of the tube a desired amount depending on the diameter of the body 21. This inclined end face 34 forms an inclined plane which is adapted to coact with the leading end 35 of an adjustment screw 36 to provide the continuous adjustment. The leading end 35 of the adjustment screw 36 has a conical face 37 wherein the surface of the cone is inclined to the longitudinal axis of the tube 2' an amount substantially equal to the angle of inclination of the inclined end face 34 of the cam 31.

For a ⅝ inch diameter body 21 it has been found that the angle of inclination with respect to the longitudinal axis of the tube of the inclined end face 34 of the cam 31 and of the conical face 37 of the adjustment screw 36 should be from about 15° to about 45°. The aforenoted angles of inclination for the cam faces 32 and 34 and the conical and included faces 37 and 30 of the adjustment screw 36 and adjustable slide 24, respectively, provide a total range of adjustment for the slide 24 inwardly or outwardly of from about 0.020 inch to about 0.1 inch. Other combinations of angles of inclination and body diameters would permit considerable modification in the range of adjustment of the adjustable slide 24.

In operation, as the adjustment screw 36 is screwed into the body 21 of the scarfing apparatus 20 the conical face 37 of the screw 36 acts upon the inclined end face 34 of the cam 31 to move the cam in a direction toward the closed end of the bore 22. This movement of the cam 31 causes through coaction of the inclined face 32 of the cam and the inclined face 30 of the adjustable slide 24 outward movement of the slide 24 from the body 21. Similarly, a withdrawal of the screw 36 causes the slide 24 to move inward due to pressure exerted upon it by the tube 2' surface which in turn causes a corresponding movement of the cam 31 which is limited by the depth to which adjustment screw 36 protrudes in the bore 22.

Only one slide 24 has been shown to be adjustable in the scarfing apparatus 20 of figs. 2 and 3 since only three slides are employed in that apparatus; however, in other apparatuses such as the scarfing apparatus of U.S. Pat. No. 3,349,212, more than one slide 24 could be made adjustable by merely providing a cam 31 having more than one inclined face 32 which act upon the corresponding inclined faces 30 of the adjustable slides.

The purpose of the adjustable slide 24 in accordance with this invention is to enable the scarfing apparatus 20 to be preloaded to eliminate tool chatter during operation of the welding apparatus. If the adjustable slide is improperly adjusted and the scarfing apparatus 20 rides too loosely within the tube 2', tool chatter results which adversely effects the quality of the scarfed surface.

Referring to FIG. 6, it is readily apparent that the height H of the radial slides 23 and 24 will vary depending on the tube 2' diameter. Therefore, it is necessary to change to slides 23 and 24 of different heights for given tube diameters. The adjustment provided in accordance with this invention is not sufficient to compensate for marked differences in tube diameter. However, it is sufficient to compensate for the differences in inside diameter of the tube as compared to the outside diameter due to differences in tube wall thicknesses.

In accordance with another embodiment of the scarfing apparatus 20 of this invention, the cutting tool 40 has a circular cutting edge 41 as shown in FIG. 3 so that it may be indexed from time to time to provide a fresh sharp cutting edge segment as the used segment is dulled. The use of a cutting tool that may be indexed is not new, see for example U.S. Pat. No. 3,349,212.

The cutting tool 40 of FIG. 4 has a frustrated conical shape and is uniquely adapted for use in the scarfing apparatus 20 of FIGS. 2 and 3 in that the plane 42 cutting edge 41 may be inclined with respect to the longitudinal axis of the tube 2' at an angle of from about 30° to about 60° with the preferred angle of inclination being approximately 45°.

As shown in FIG. 2, inclining the cutting tool 40 as aforenoted results in the provision of an excellent path for the scarf or weld bead 14 which is being removed to travel through the body 21. Further, and more significantly, as shown in FIG. 5 inclining the circular cutting tool 40 increases the effective width of the operable segment 43 cutting edge 41 with respect to the inside surface of the tube 2'. FIG. 5A shows that if the plane 42 of the cutting edge 41 is normal to the longitudinal axis of the tube 2', there would be a fairly narrow operable segment 43 of the cutting edge.

As shown in FIG. 5B when the plane 42 of the cutting edge 41 of the tool 40 is inclined to the longitudinal axis of the tube 2' at an angle of approximately 45° there results a geometric advantage which provides an increase in the operable segment 43 of the cutting edge 41 and a consequent increase in the width of the scarf removal area. This geometric advantage allows a relatively small diameter cutting tool 40 to be used inside a larger diameter tube 2' and also allows the tool 40 to be employed for scarfing tubes having a range of diameters.

Therefore, it has been found in accordance with this invention that a ⅜ inch diameter cutting tool 40 can effectively scarf tube diameters of five-eighths to seven-eighths inch; that a ½ inch diameter tool 40 is effective for tubes having a diameter of ⅞ to 1⅛ inch; and that a ¾ inch diameter tool 40 is effective for tube diameters of 1⅛ inch to 3⅛ inch.

FIG. 6 illustrates the effectiveness of the tool inclined at the 45° angle in accordance with this invention for scarfing tubes having an outside diameter of ⅞ inch, 1 inch and 1⅛ inch. The cutting tool 40 may be attached to the body 21 by any conventional means. The cutting tool 40 in accordance with FIGS. 2 and 3 is intermittently adjustable; however, a continuously adjustable cutting tool analogous to that of U.S. Pat. No. 3,349,212 could be employed. The tool 40 in FIGS. 2 and 3 is held in place in the body 21 by means of a clamp 44 comprising a plate 45 and screw 46 which secures the plate and thereby clamps the tool to the body.

The tool 40 rests against an inclined recessed surface 47 in the body 21 which effectively sets the angle of inclination of the tool and also against a recessed shoulder 48. The height of the cutting edge 41 above the surface of the body 21 which determines the depth of the cut during scarfing may be changed by inserting shims between the inclined surface 47 and the leading face 40 of the tool 40 thereby moving the tool along the shoulder 48 which by virtue of its incline increases or decreases the amount of metal removal depending on the position of the tool.

A conduit 50 is provided just in front of the cutting tool 40 and in communication therewith and it extends completely through the body 21 of the apparatus 20. The conduit 50 is inclined at an angle substantially the same as that of the cutting tool 40. The scarf or weld bead 14 which is removed passes through the conduit 50 to the opposing surface of the tube 2' where it is withdrawn within the travelling tube.

In the apparatus of FIGS. 2 and 3, a moveable joint 60 is provided which generally allows the body 21 of the apparatus 20 to pivot in the vertical direction thereby providing for any curvature or flexing in the as-welded tube without impairing the alignment of the cutting tool 40. The moveable joint 60 comprises a slot 61 in the upstream end of the scarfing apparatus 20 which is adapted to receive the tongue 62 of the connecting member 63. A pin 64 passing through the body 21 at the slot 61, and the tongue 62 of the connecting member 63, provides for the pivoting motion. The other end of the connecting member 63 is adapted to be secured to a conventional means (not shown) for holding the scarfing apparatus in place during welding.

In practice, the height of the continuously adjustable slide 24 can be adjusted in line in the welding apparatus by either cutting a hole in the welded tube 2' at a point adjacent to the adjusting screw 36 or by allowing the tube 2 to pass through the welding station without welding the strip edges together so that they may be pried apart to perform this adjustment. The slide 24 is adjusted until resistance is met in the tightening of the adjustment screw 36 thereby providing a snug but moveable association between the scarfing apparatus 20 and the welded tube 2'. Alternatively, these adjustments may be performed off line utilizing a section of as-welded tube 2' and cutting a hole above the adjustment screw 36 as aforenoted or merely leaving the adjustment screw extending out from the end of the tube. The height of the cutting edge is normally adjusted off line utilizing a section of as-welded tube 2' and shims as aforenoted.

The body 21 of the scarfing apparatus 20 may be formed of any desired material; however, preferably, it should be a non-magnetic material such as austinitic stainless steel or aluminum-bronze.

Referring again to FIG. 4, the cutting tool 40 is shown. In accordance with an alternative embodiment as compared to the tool 40 of FIGS. 2 and 3, a frustrated conical discharge surface S may be employed intermediate the cutting tool face 49 and the cutting edge 41. This conical discharge surface S should be inclined with respect to the plane 42 of the cutting edge 41 from about 10° to about 20° and, preferably, approximately about 15°. The cone base of the discharge surface S comprises the plane 42 of the cutting edge 41.

The purpose of the conical discharge surface S is to change the discharge angle so as to provide a better angle of travel for the scarf 14 which is being removed and further to give the cutting edge 41 more cross section which is beneficial for machinability of different materials.

For example, with the plane 42 of the cutting edge 41 inclined at an angle of about 45° to the longitudinal axis of the tube, the use of a tool having a conical discharge surface inclined with respect to the plane of the cutting edge at an angle of about 15° increases the discharge angle with respect to the longitudinal axis of the tube from 45° to about 60°.

Therefore, in summary, in accordance with one embodiment of the instant invention at least one continuously adjustable slide is provided in the scarfing apparatus for maintaining the alignment of the apparatus within the welded tube, and in accordance with another embodiment of the invention, a cutting tool having a circular cutting edge which can be indexed and which is inclined to the longitudinal axis of the tube is provided in the scarfing apparatus. Alternatively, both of these embodiments may be provided in the same scarfing apparatus.

The term "body diameter" as employed in the aforenoted description refers to the diameter of the body at the upstream end of the scarfing apparatus as employed during welding. Referring to FIGS. 2 and 3, the upstream end is the end with the moveable joint 60.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A scarfing apparatus for removing the weld bead on the inside surface of a welded tube comprising:
   an elongated body member;
   means supported by said body for removing said weld bead;

a plurality of slides radially dispersed about the periphery of said body, said slides being operable to align said body and said removal means within said tube;

at least one of said slides being continuously adjustable outwardly or inwardly with respect to said body;

means supported by said body for providing said continuous adjustment for said at least one of said slides; and wherein said body has a bore of a desired diameter extending substantially centrally and longitudinally within it and wherein said body also has at least one hole adapted to receive said at least one adjustable slide, said at least one hole communicating with said bore and wherein said means for providing said continuous adjustment includes means supported within said body and said bore for acting upon said at least one adjustable slide to move it inwardly or outwardly.

2. A scarfing apparatus as in claim 1 wherein said means supported within said bore and said body comprises an elongated longitudinally extending cam which acts upon said at least one adjustable slide and an adjustment screw within said body which communicates with said bore and which acts upon said elongated cam.

3. A scarfing apparatus as in claim 2 wherein an inside face of said at least one slide is inclined a desired amount to the longitudinal axis of said tube and at least one longitudinally extending face of said cam which is adapted to act upon said inclined face of said at least one slide is inclined to the longitudinal axis of said tube at an angle substantially the same as said slide face, said faces contacting one another, and further wherein an end face of said cam is inclined to the longitudinal axis of said tube a desired amount and the leading end of said adjustment screw has a conical face which is inclined to the longitudinal axis of said tube at an angle substantially the same as said end face, said conical face contacting said end face, whereby when said adjustment screw is adjusted to protrude to a greater or lesser extent into said bore the coaction of said end face of said cam and said conical face of said screw causes said cam to move longitudinally within said bore, which in turn through the coaction of said inside face of said at least one slide and said longitudinal face of said cam causes said slide to move outwardly or inwardly respectively, with respect to said body.

4. A scarfing apparatus as in claim 3 wherein said means for removing said weld bead comprises a cutting tool having a circular cutting edge which may be indexed wherein the plane of the cutting edge is inclined toward the longitudinal axis of the tube at an angle of from about 30° to about 60°.

5. A scarfing apparatus as in claim 4 wherein said cutting tool further includes a leading face and a frustrated conical discharge surface intermediate said cutting edge and said leading face and wherein said plane of said cutting edge comprises the base of said conical discharge surface and wherein said conical discharge surface is inclined to said plane of said cutting edge at an angle of from about 10° to about 20°.

6. A scarfing apparatus for removing the weld bead on the inside surface of a welded tube comprising:

an elongated body member;

means supported by said body for removing said weld bead comprising a cutting tool having a circular cutting edge which may be indexed, wherein the plane of the cutting edge is inclined toward the longitudinal axis of the tube at an angle of from about 30° to about 60° and wherein said cutting tool further includes a leading face and a frustrated conical discharge surface intermediate said cutting edge and said leading face and wherein said plane of said cutting edge comprises the base of said conical discharge surface and wherein said conical discharge surface is inclined to said plane of said cutting edge at an angle of from about 10° to about 20°;

a plurality of slides radially dispersed about the periphery of said body, said slides being operable to align said body and said removal means within said tube;

at least one of said slides being continuously adjustable outwardly or inwardly with respect to said body; and means supported by said body for providing said continuous adjustment for said at least one of said slides.

7. A scarfing apparatus for removing the weld bead on the inside surface of a welded tube comprising an elonagted body member adapted to ride within said welded tube and a cutting tool supported by said body for removing said weld bead, said cutting tool having a circular cutting edge with the plane of said cutting edge being inclined to the longitudinal axis of said tube at an angle of from about 30° to about 60° wherein said cutting tool further includes a leading face and a frustrated conical discharge surface intermediate said cutting edge and said leading face and wherein said plane of said cutting edge comprises the base of said conical discharge surface and wherein said conical discharge surface is inclined to said plane of said cutting edge at an angle of from about 10° to about 20°.

* * * * *